US012283665B2

(12) United States Patent
Chakradeo et al.

(10) Patent No.: US 12,283,665 B2
(45) Date of Patent: Apr. 22, 2025

(54) HIGH TEMPERATURE BATTERIES

(71) Applicants: R-CUBE ENERGY STORAGE SYSTEM LLP, Pune (IN); FRAUNHOFER-GESELLSCHAFT ZUR FÖRDERUNG DER ANGEWANDTEN FORSCHUNG E. V., Munich (DE)

(72) Inventors: Amarnath Ashok Chakradeo, Pune (IN); Martin Hofacker, Jena (DE)

(73) Assignees: FRAUNHOFER-GESELLSCHAFT ZUR FORDERUNG DER ANGEWANDTEN FORSCHUNG E.V., Munich (DE); R-CUBE ENERGY STORAGE SYSTEM LLP, Pure (IN)

( * ) Notice: Subject to any disclaimer, the term of this patent is extended or adjusted under 35 U.S.C. 154(b) by 579 days.

(21) Appl. No.: 16/482,135

(22) PCT Filed: Jan. 29, 2018

(86) PCT No.: PCT/IN2018/050043
§ 371 (c)(1),
(2) Date: Jul. 30, 2019

(87) PCT Pub. No.: WO2018/138740
PCT Pub. Date: Aug. 2, 2018

(65) Prior Publication Data
US 2020/0006813 A1 Jan. 2, 2020

(30) Foreign Application Priority Data

Jan. 30, 2017 (IN) .............................. 201721003383

(51) Int. Cl.
*H01M 10/39* (2006.01)
*H01M 50/431* (2021.01)
(Continued)

(52) U.S. Cl.
CPC ......... *H01M 10/39* (2013.01); *H01M 50/431* (2021.01); *H01M 50/46* (2021.01); *H01M 50/463* (2021.01); *H01M 50/489* (2021.01)

(58) Field of Classification Search
CPC .... H01M 10/39; H01M 50/431; H01M 50/46; H01M 50/463
See application file for complete search history.

(56) References Cited

U.S. PATENT DOCUMENTS 4,012,562 A   3/1977 Saunders
4,216,273 A * 8/1980 Cadart ...................... C25C 3/02
                                                                 429/50
(Continued)

FOREIGN PATENT DOCUMENTS

JP    2000040522 A    2/2000

OTHER PUBLICATIONS

International Search Report and Written Opinion issued in PCT/IN2018/050043, mailed May 7, 2018; ISA/EP.

*Primary Examiner* — Matthew T Martin
*Assistant Examiner* — Adam J Francis
(74) *Attorney, Agent, or Firm* — Harness, Dickey & Pierce, PLC

(57) ABSTRACT

The present disclosure discloses a high temperature cell system. The cell system may comprise at least two distinct cathode chambers. The cell system may further comprise a separator having a hollow structure enclosed between a first wall and a second wall, wherein the separator is configured to enable ion transfer between the first wall and the second wall. Further the hollow structure of the separator may define at least one anode chamber. The cell system may comprise a base configured to provide a common sealing to the at least two cathode chambers and the separator at one first end and second end respectively.

30 Claims, 6 Drawing Sheets

(51) Int. Cl.
   *H01M 50/46*    (2021.01)
   *H01M 50/463*   (2021.01)
   *H01M 50/489*   (2021.01)

(56) References Cited

U.S. PATENT DOCUMENTS

| | | | | |
|---|---|---|---|---|
| 5,272,020 | A * | 12/1993 | Flack | H01M 6/08 |
| | | | | 429/141 |
| 2004/0131922 | A1* | 7/2004 | Anglin | H01M 50/578 |
| | | | | 429/54 |
| 2009/0011331 | A1* | 1/2009 | Stringer | C22C 29/12 |
| | | | | 429/185 |
| 2011/0223460 | A1* | 9/2011 | Farmer | H01M 50/431 |
| | | | | 429/104 |
| 2011/0236749 | A1* | 9/2011 | Sarrafi-Nour | H01M 10/42 |
| | | | | 429/164 |
| 2012/0263996 | A1* | 10/2012 | Park | H01M 50/463 |
| | | | | 429/149 |
| 2012/0301791 | A1* | 11/2012 | Kojima | H01M 50/46 |
| | | | | 429/246 |
| 2015/0064532 | A1* | 3/2015 | Kumar | H01M 10/399 |
| | | | | 429/102 |
| 2016/0197373 | A1* | 7/2016 | Shaffer, II | H01M 50/411 |
| | | | | 429/210 |

* cited by examiner

HIGH TEMPERATURE BATTERIES

CROSS REFERENCE TO RELATED APPLICATIONS

This application is a U.S. National Phase Application under 35 U.S.C. 371 of International Application No. PCT/IN2018/050043 filed on Jan. 29, 2018, which claims the benefit of priority from Indian Patent Application number 201721003383 filed Jan. 30, 2017. The entire disclosures of all of the above applications are incorporated herein by reference.

TECHNICAL FIELD

The present invention relates to a high temperature batteries and more particularly relates to a design of the high temperature batteries and separator used in the batteries.

BACKGROUND

High temperature rechargeable batteries like Sodium Nickel Chloride (Na—$NiCl_2$) are currently being used for power storage and supply in application like Fuel cell, electric vehicles, etc. The efficiency and higher life cycle of these batteries make them more suitable for such operation over the Lithium Ion batteries. Further ease of availability of the raw material, both in terms of cost and availability, makes the production of Sodium Nickel Chloride (Na—$NiCl_2$) cheaper.

However, the present Na—$NiCl_2$ batteries have a few drawbacks related to the design and the size of the batteries. The present Na—$NiCl_2$ batteries have lower power densities and a limitation on its size reduction.

SUMMARY

In an aspect of the present invention, a modified design of a high temperature battery is disclosed to achieve increased electro mobility of an active surface for higher power densities.

In one implementation, a high temperature cell system is disclosed. The cell system may comprise at least two distinct cathode chambers. The cell system may further comprise a separator having a hollow structure enclosed between a first wall and a second wall, wherein the separator is configured to enable ion transfer between the first wall and the second wall. Further the hollow structure of the separator may define at least one anode chamber. The cell system may comprise a base configured to provide a common sealing to the at least two cathode chambers and the separator at one first end and second end respectively.

In another implementation, a high temperature electrochemical cell system is disclosed. The cell system may comprise a housing unit. Further at least one separator having a first wall and a second wall, may be located within the housing unit. The cell system may further comprise a cathode electrode connected to at least one cathode chamber and may be located between the housing unit and the at least one separator. Further a hollow portion formed between the first wall and the second wall of the at least one separator may define at least one anode chamber comprising an electrode, connected to the at least one anode chamber. The at least one separator electrically insulates the at least one cathode chamber from the at least one anode chamber, and enables ion transfer between the first wall and the at least second wall.

BRIEF DESCRIPTION OF THE DRAWINGS

The detailed description is described with reference to the accompanying figures.

DETAILED DESCRIPTION

Figure 1:
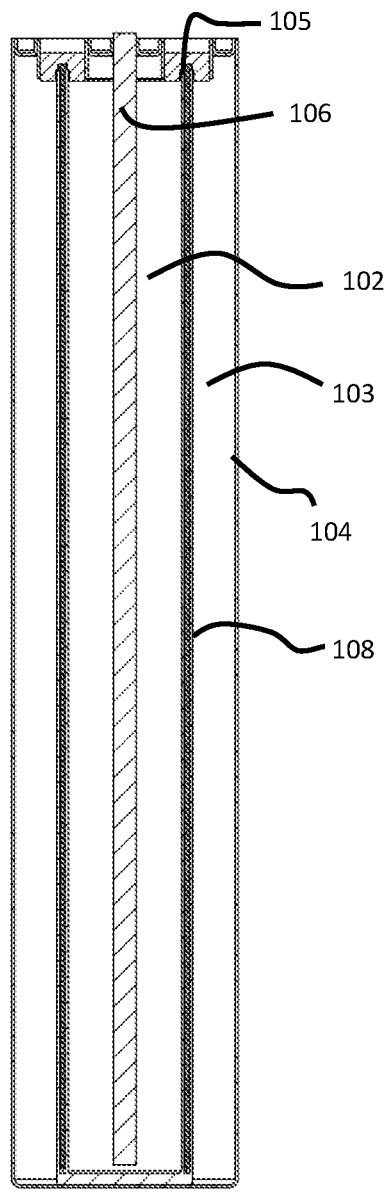
FIG. 1, illustrates an exemplary embodiment in accordance with the present disclosure.

In an exemplary embodiment of the present disclosure, a multi chamber design of a high temperature battery is disclosed. The battery in the present exemplary embodiment may be Na—$NiCl_2$ battery. The multi chamber Na—$NiCl_2$ battery may comprise in one embodiment at least two cells configured to supply power and are mutually electrically insulated and in another embodiment the multi chamber cell has a multi walled separator for surface enlargement in one cell. The Sodium (Na) ions in the exemplary embodiment may be conducted through at least double walled or double side solid electrolyte connected with the cathode chambers. In one embodiment only one of the at least two walls is closed and in another embodiment all separator walls are end capped.

Further the multi chamber cell may comprise a separator with hollow structure. The hollow structure of the separator may be defined by a first wall and at least second wall. In another exemplary embodiment the hollow structure may further have a plurality of chambers within the hollow structure. The plurality of chambers in an exemplary embodiment may provide hollow support structures, while in another embodiment they may be configured to act as anode chambers. In another exemplary embodiment it is possible to have many anode and cathode chambers within the numerous separator walls. The separator further may be made of Sodium Beta Aluminate (Na-β-Aluminate).

According to the exemplary embodiment the separator may be at least double sided thereby enabling a single cell to have at least two cathode chambers and one anode chamber. Further the hollow space between the first wall and the second wall of the separator may act as sodium reservoir. Na ion exchange may happen inside the separator or in a secondary electrolyte (e.g. $NaAlCl_4$ as part of the cathode). The multi chamber cell of the present embodiment including a multi wall separator which in turn is made of β-Alumina and may be fabricated using molding and extrusion process. Thereby enabling mass production. Further the multi chamber cell may be sealed by a metal housing which in turn may be welded to a base of a metal ceramic-compound. Further the separator, may define at least two of three chambers (one anode and one cathode), and may be closed at one end. Further sealing of the double walled separator at one side during the extrusion process by forming a monolithic mold may also enable the seal to be electrochemically inactive thereby increasing the lifetime of the separator. If only one wall of the multi walled separator is closed than the separator wall closure in the bottom becomes electrochemically active.

Using a double or multi walled separator will increase the available surface area during the charging and discharging process for the sodium ion exchange and will therefore reduce the ohmic resistance in the cell. The lower the ohmic resistance in the cell the lower is the voltage drop during the discharging process and hence increased performance of the cell. In order to increase the volumetric and gravimetric energy density of a high-temperature battery cell, it is necessary to realize a favorable separator surface area to cathode volume ratio. A further advantage of such a, at least double walled separator, is the possibility to decrease the wall thickness of the separator because of the support structure in-between the separator walls which is accompanied by a reduced mass of the cell and faster sodium ion exchange. Using the double or multi walled cell design will increase the number of additional cathode chambers in the case of an appropriate design, electrical insulation and interconnection of the cathode chambers. Using different kind of cathode composition a cathode may be protected with lower redox potential (e.g. Na—$FeCl_2$) from power peaks and therefore degradation, if the higher current is applied to the cathode with a higher redox potential (e.g. Na—$NiCl_2$).

FIG. 1 illustrates an exemplary embodiment in accordance with the present disclosure. The embodiment discloses a multi-chamber design for high temperature battery cell like a Na—$NiCl_2$ battery. The multi-chamber battery cell of the present disclosure may have circular cell geometry. The high temperature battery with multi-chamber cell of the present embodiment may further comprise at least two cathode chamber 102 and 103 mutually electrically insulated through a double wall solid electrolyte 108. One cathode chamber is located in the center of the cell 102 and a second one in-between the metal case 104. Further the multi-chambers of the cell may be housed in a metallic-ceramic housing 105. One cathode chamber from the at least two cathode chambers may be hermetically sealed by welding the metallic case (cathode electrode 104) to the metal part of the metal-ceramic compound 105. The central cathode 102 is electrically conducted by a central electrode 106. The double wall solid electrolyte 108 may also act as a double-walled separator and this may be possible due to the electrical isolation of the both cathode chambers 102 and 103. In the present embodiment, the double wall separator 108 may form a chamber resembling a U shape cross-section, and further encloses one anode chamber 108 from the at least two cathode chambers 102 and 103. Further anode chamber and anode electrode may be enclosed within the double walled separator 108. The double walled separator allows the interconnection of the cells by means of the electrical insulation of the cathode chambers, in which preferably identical cathode chambers for instance the inner cathode 102 of each cell is interconnected from one multi walled cell to another.

In another exemplary embodiment, an additional cathode chamber may be introduced between the housing and a large separator. Thus, the diameter of the separator, which in the present embodiment is 23 mm in the comparison to the outer diameter of the cell with 40 mm is considerably lower. However, it is also possible to vary the outer diameter of the at least doubled walled separator between 20 mm to 200 mm.

Figure 2:
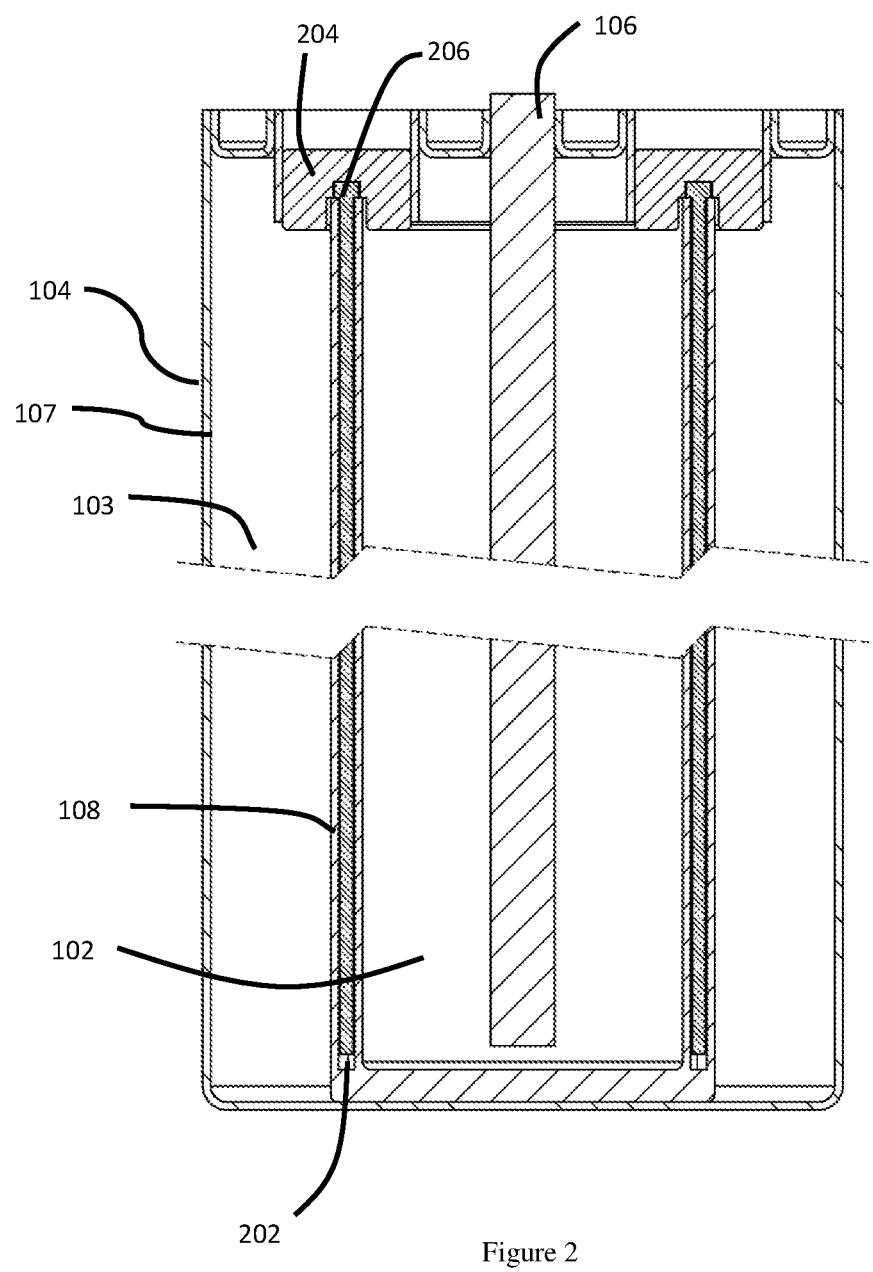
FIG. 2 illustrates a top section of the present disclosure.

Now referring to FIG. 2, illustrates a top section of the present disclosure. The section illustrates a housing 104 enclosing a multi-chamber cell of a high temperature battery. The housing 104 can be fabricated or manufactured from a metal. Further the inner side of the metal housing 104 may act as a cathode electrode 107 and should be stable against the liquid secondary electrolyte. It is suggested to use a stable metal or a protective coating for the metal case e.g. made of Ni or Mo. The cathode electrode 107 may be enlarged thus providing cathode-side electrode surface greater than by at least a factor of 4 in comparison to a centrically arranged cathode electrode 106. By using the metal case as cathode electrode will increase the maximum storable capacity because the electrode itself will not displace cathode mass.

The cathode electrode 106 may interact electrically with a cathode chamber 102 and the cathode electrode 107 with the cathode chamber 103. The at least two cathode chambers (102 and 103) may be electrically insulated from each other via a double walled separator 108. The double walled separator 108 can be manufactured by extruding beta alumina. The double walled separator 108 may have a U-shape in accordance with the present disclosure. Further alpha alumina ($Al_2O_3$) may be used to fabricate at least one circular ring 204 that may be mounted on the upper surface of the battery, wherein a glass sealing may be positioned between the circular ring and separator. Further the double wall separator 108 may enclose an anode chamber 202 with segmented separator (supporting structure) simplified as anode chambers and can be connected with one or many electrical feed. The anode chamber may further be connected to at least one anode electrode 206 extending outward in the upper section of the battery.

Figure 2B:
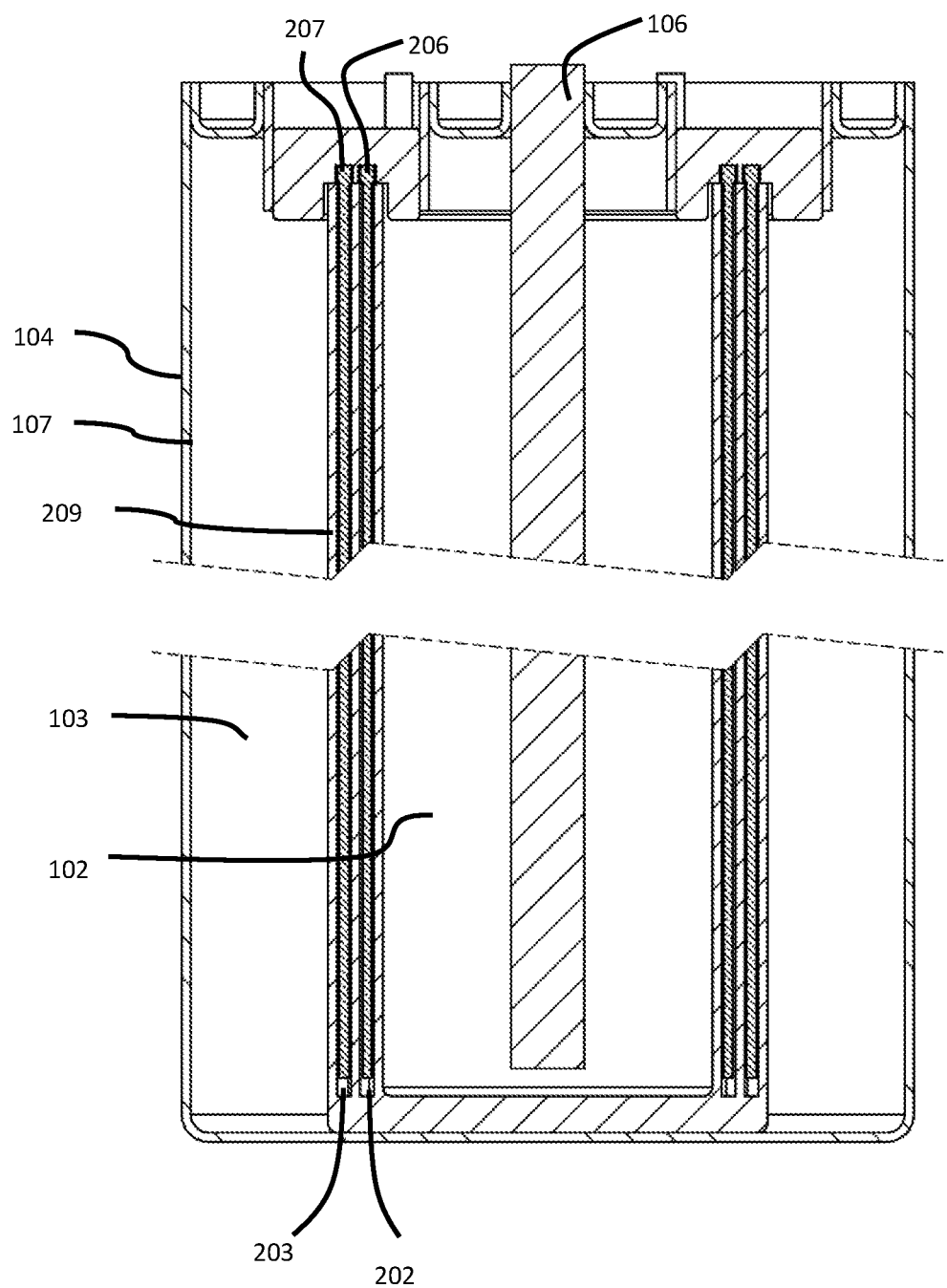
FIG. 2B illustrates another embodiment of a multi walled separator.

Referring to FIG. 2B shows another embodiment of a multi walled separator 209. The cell may comprise of an inner cathode 102 (including an electrode 106) and an outer cathode located between the cell case 104 which closes the cell hermetically and acting simultaneously as second cathode electrode 107. The hollow space inside the separators walls is divided into an outer anode 203 (including an electrode 207) and an inner anode 202 (including an electrode 206), whereby both the anode chambers are electrically insolated.

Another disclosure of the invention is the possibility to reduce the size of the anode chambers inside the separator walls and by relocating free space of the anode substance (in case of a Na—$NiCl_2$ cell used for liquid sodium storage) to the outside of the multi walled separator through a metallic and chemically resistance container. By charging a Na—$NiCl_2$ will increase the sodium filling height inside the hollow space of the separator up to the externally arranged container (not shown in the sketches).

The double wall separator 108 can be manufactured by molding process of extrusion for Na-ß-aluminate. Further during the production process the base of the double walled separator 108 may be made as a solid material, thereby removing any gap in the base region makes the intermediate space in principal electrochemically inactive and creating a U like shape.

In an exemplary embodiment of the high temperature battery with multi-chamber cell the outer diameter (Da) may be 23 mm and inner diameter (Di) may be 20 mm with a length of L 185 mm. The double walled separator may be manufactured by the molding method of extrusion. Further the enclosed base support may enable production of 0.5 mm (61 g) or 0.75 mm (86 g) wall thickness, with which the separator may become approximately 50 percent lighter in comparison to a single wall, single cell design with similar capacity and 1.5 mm wall thickness.

Figure 3:
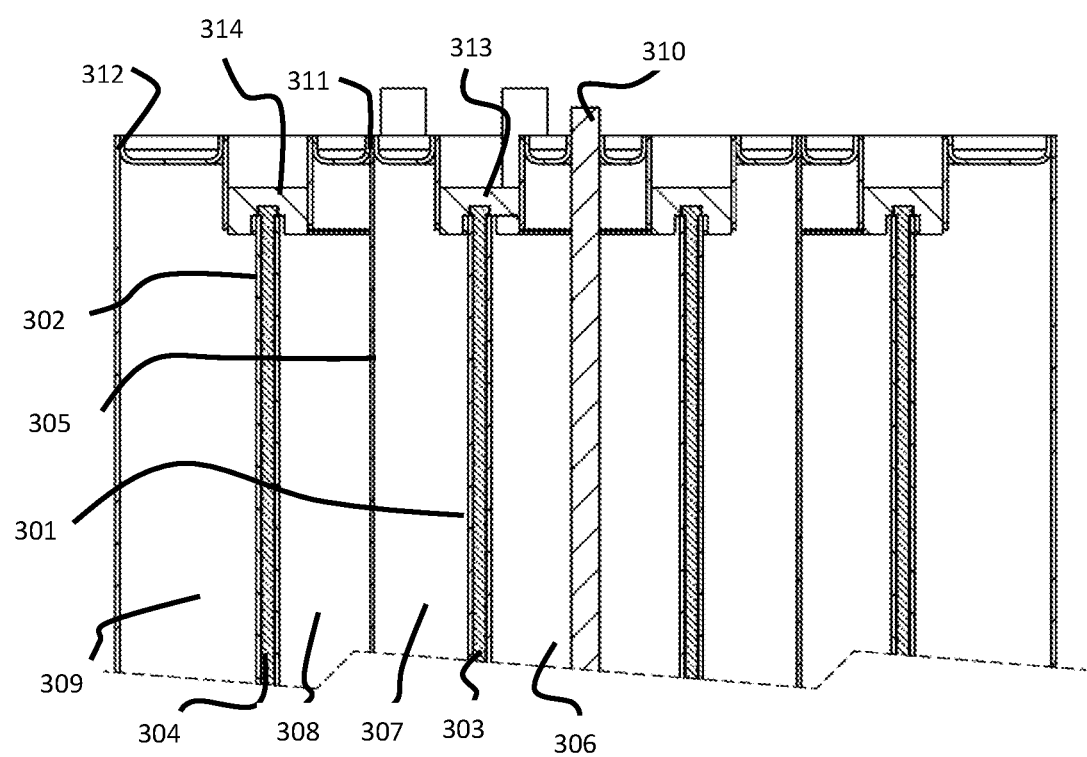
FIG. 3 illustrates another exemplary embodiment in accordance with the present disclosure.

Referring to FIG. 3 illustrates another exemplary embodiment of the present disclosure. The cell may comprise of at least two separators identical in construction, but different in its diameter and length. The inner double walled separator 301 and the outer separator 302 are centrically arranged. Each separator may further comprise at least an outer and an inner wall, which may be in direct contact with the formed anode space where the Na is deposited during the charging process of a Na—NiCl2 cell. The innermost separator 301 may form a first anode chamber 303 which is in direct contact with the first anode electrode 313 and the outer separator 302 including a second anode chamber 304 which is in turn contacted by a second electrode 314. In the center of this multi tube, multi chamber cell is located a first cathode 306 and a cathode electrode 310. The cathode electrode 311 e.g. made of nickel will contact the cathode chamber 307 and 308 respectively. In one embodiment, is the cathode chamber 307 and 308 may be separated from each other via the electrical conductive electrode 311 shaped like a metal pipe or a bent sheet of metal. In another embodiment both cathode chambers 307 and 308 can be directly connected to each other for instance when the electrode 311 will not spatially separate the both chambers. Thus both cathode chambers are at the same potential if they are not electrically isolated from each other. The electrode 311 is centered and fixed in its location during the cathode filling operation to the two ceramic rings 305, to which in turn the separators are joined. The outermost cathode chamber 309 is located in-between the separator 302 and the metallic cell case 312. The metallic cell case will hermetically close the cell and acting simultaneously as cathode electrode 309.

Figure 4:
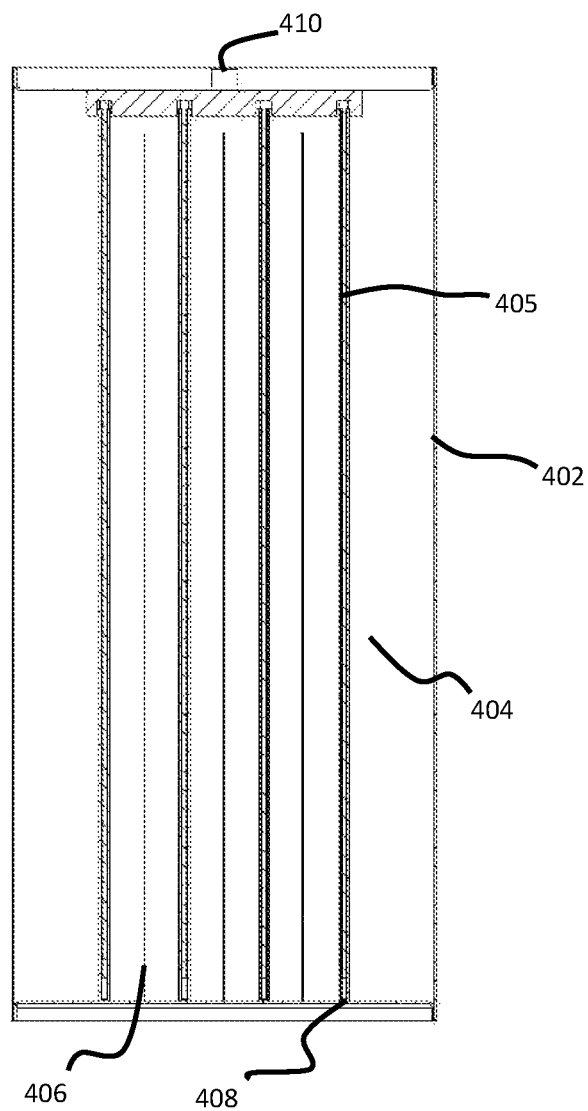
FIG. 4 illustrates a double walled separator in accordance with the present disclosure.

Referring to FIG. 4 illustrates another exemplary embodiment in accordance with the present disclosure. In the present exemplary embodiment, a multi-chamber Na—NiCl$_2$ cell separator 408 may be manufactured thin, closed on one side with a rectangular shape 405. These plate-shaped separators 408 can be manufactured by extrusion or film pulling. Further the anode-side electrode 410 is electrically insulated from the cathode electrode 402 or cathode chamber 404 to avoid a short circuit. To increase the surface area of the cathode electrode 402 it is possible to weld metal plates 406 to the bottom of the metallic cell case.

Figure 5:
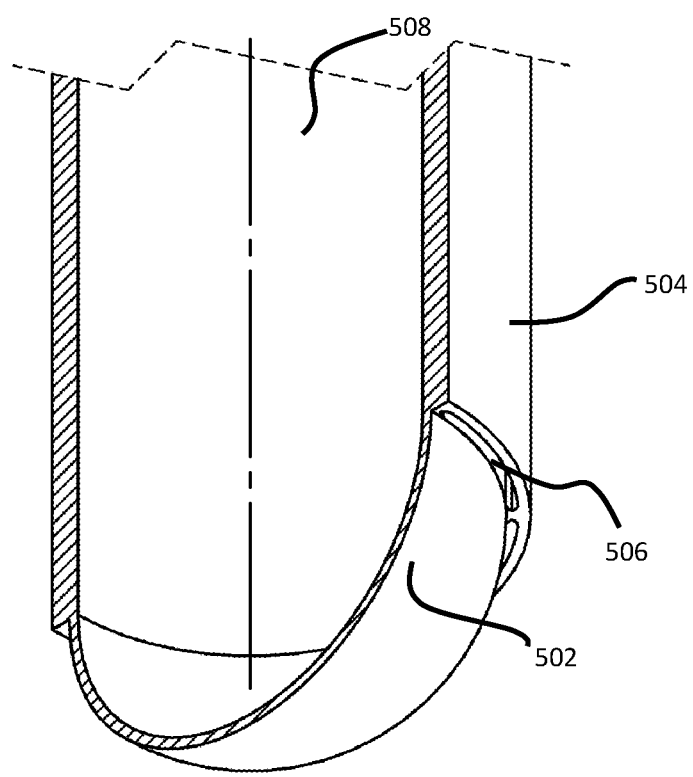

FIG. 5 illustrates a double walled separator in accordance with the present disclosure. The double wall separator as illustrated may have a first wall 502 and a second wall 504. The first wall 502 and the second wall 504 may enclose a support structure 506, wherein the support structure 506 may be hollow. The cathode chamber 508 is favorably located inside the separator. If the anode chamber which surrounds the separator is not evacuated there is a possibility to add openings in top of the separator's outermost side walls for the hollow chambers to prevent an over presser until the liquid sodium is built during the charging process. In another embodiment is the outermost side wall may be manufactured shorter in comparison to the innermost side walls to prevent overpressure.

In a further embodiment, it is also possible to close only the outermost wall of the separator while the innermost wall may not be closed or it is possible to produce a higher amount of separator walls, located at the inside and the outside of the separator while at least one of the separator walls is closed to enlarge the surface area of the separator. To prevent overpressure in the absence of a vacuum, it is also possible to manufacture a separator with a shorter inner side wall in comparison to the outer side wall or one can add openings in the upper closure region.

We claim:

1. A high temperature cell system comprising:
at least two distinct cathode chambers;
a monolithic separator having a hollow structure enclosed between a first wall and a second wall, wherein the monolithic separator is configured to enable ion transfer between the first wall and the second wall;
at least one anode chamber defined by the hollow structure of the monolithic separator;
an outer metallic housing laterally surrounding the monolithic separator and the chambers, the housing being configured to act as an outer cathode within an outer of the cathode chambers;
a central cathode located along a longitudinal centerline within a central of the cathode chambers, the central cathode being elongated along a majority longitudinal length of the central of the cathode chambers;
a longitudinally elongated anode located within the anode chamber of the monolithic separator, and extending a majority longitudinal length therein;
a lateral thickness of the anode being less than a lateral thickness of the central cathode; and
a base providing a common sealing to the at least two cathode chambers and the monolithic separator at one end, wherein the monolithic separator is closed at an opposite end;
a second separator including multiple walls with another anode therebetween, the separators being spaced apart from each other and having different lateral diameters and longitudinal lengths relative to each other; and
multiple ceramic rings center and fix the central cathode, and the separators being joined to the ceramic rings.

2. The high temperature cell system of claim 1, wherein the monolithic separator is made of sodium beta aluminate (Na—β-Aluminate), and the anode laterally contacts against facing internal surfaces of the walls of the monolithic separator.

3. The high temperature cell system of claim 2, wherein the at least two cathode chambers and the at least one anode chamber are electrically insulated from each other.

4. The high temperature cell system of claim 1, wherein the innermost wall of the monolithic separator has a diameter of 5 up to 198 mm.

5. The high temperature cell system of claim 1, wherein:
the outermost wall of the monolithic separator has a diameter of 7 up to 200 mm;
the base is located spanning between the first wall and the second wall, defining an enclosed bottom of the hollow structure within which is received the anode, a gap is located between a bottom end of the anode and the base, the hollow structure is entirely linearly aligned with the anode therein, and the enclosed bottom of the hollow structure terminates laterally offset from the cathode.

6. The high temperature cell system of claim 4, wherein the monolithic separator has a length of 20 up to 1000 mm.

7. The high temperature cell system of claim 1, wherein the at least two cathode chambers having rectangular shape are positioned adjacent the monolithic separator.

8. The high temperature cell system of claim 1, further comprising a second anode, the anodes are located in the hollow spaces inside the innermost and the outermost side walls of the same monolithic separator in spaced apart and parallel orientations.

9. A high temperature electrochemical cell system, comprising:
a housing unit;
at least one separator having a first wall and a second wall, located within the housing unit, the separator being a solid electrolyte;
at least one cathode chamber formed by the housing unit and the at least one separator;

a cathode electrode connected to the at least one cathode chamber;

at least one anode chamber defined by a hollow portion formed between the first wall and the second wall of the at least one separator; and an anode electrode connected to the at least one anode chamber and disposed within the at least one separator between the first wall and the second wall;

wherein the anode electrode laterally contacts against facing internal surfaces of the walls of the separator, and the anode electrode longitudinally extends a majority length of the hollow portion of the separator;

wherein the at least one separator electrically insulates the at least one cathode chamber from the at least one anode chamber with one of the first wall or the second wall, and enables ion transfer between the first wall and the second wall; and a base located spanning between the first wall and the second wall, defining an enclosed bottom of the hollow portion within which is received the anode electrode, a gap being located between a bottom end of the anode electrode and the base, the hollow portion being entirely linearly aligned with the anode electrode therein, and the enclosed bottom of the hollow portion terminating laterally offset from the cathode electrode.

10. The high temperature electrochemical cell system of claim 9, wherein the high temperature electrochemical cell system is rechargeable, further comprising a second anode, the anodes being located in the at least one anode chamber of the same separator in spaced apart and parallel orientations.

11. The high temperature electrochemical cell system of claim 9, wherein the housing unit is a metal case.

12. The high temperature electrochemical cell system of claim 9, wherein the at least one cathode chamber is located within the at least one separator, further comprising a metallic-ceramic housing to which the cathode electrode is welded.

13. The high temperature electrochemical cell system of claim 9 further comprises at least one ring covering the anode electrode and a portion of at least one separator.

14. The high temperature electrochemical cell system of claim 13, wherein a metal-ceramic compound is placed between the at least one ring and the at least one cathode chamber.

15. The high temperature electrochemical cell system of claim 9 further comprises a sealing member covering an end of at least one separator, wherein the at least one separator includes at least a first separator and a second separator, the second separator include multiple walls with another anode electrode laterally contacting against the walls, and the separators being spaced apart from each other and having different lateral diameters and longitudinal lengths relative to each other.

16. The high temperature electrochemical cell system of claim 15, wherein the sealing member is made of a ceramic-ceramic compound.

17. The high temperature electrochemical cell system of claim 16, wherein the ceramic—ceramic compound is produced from glass.

18. The high temperature electrochemical cell system of claim 9, wherein two or more high temperature electrochemical cell systems are interconnected in series forming identical cathode chambers connected with each other.

19. The high temperature electrochemical cell system of claim 9, wherein the separator is made of beta aluminate ($\beta$-Aluminate).

20. The high temperature electrochemical cell system of claim 9, wherein the separator is made of sodium beta aluminate (Na—$\beta$-Aluminate).

21. The high temperature electrochemical cell system of claim 9, wherein the anode electrode is made of/or coated with Nickel or Molybdenum.

22. The high temperature electrochemical cell system of claim 9, wherein the cathode electrode is made of/or coated with Nickel or Molybdenum.

23. The high temperature electrochemical cell system of claim 9, wherein the high temperature electrochemical cell system is circular in structure.

24. The high temperature electrochemical cell system of claim 9, wherein the high temperature electrochemical cell system is rectangular in structure.

25. The high temperature electrochemical cell system of claim 9, wherein the at least one separator comprises at least one chamber.

26. The high temperature electrochemical cell system of claim 9, wherein the at least one separator is circular in structure.

27. The high temperature electrochemical cell system of claim 9, wherein the separator is manufactured with additional openings in the upper closure area at the outside of the separator to prevent overpressure inside the hollow space of the separator.

28. The high temperature electrochemical cell system of claim 9, wherein the outer side wall of the separator is shorter than the inner side wall to prevent overpressure inside the hollow space of the separator.

29. The high temperature electrochemical cell system of claim 9, wherein the separator is manufactured with additional openings in upper closure area at the inside of the separator to prevent overpressure inside the hollow space of the separator.

30. The high temperature electrochemical cell system of claim 9, wherein the innermost side wall is shorter than the outer side walls of the separator to prevent overpressure inside the hollow space.

* * * * *